United States Patent
Juso et al.

(10) Patent No.: US 12,160,337 B2
(45) Date of Patent: Dec. 3, 2024

(54) MANAGEMENT APPARATUS, MANAGEMENT METHOD, COMPUTER-READABLE MEDIUM STORING PROGRAM

(71) Applicant: NEC Corporation, Tokyo (JP)

(72) Inventors: Wataru Juso, Tokyo (JP); Hajime Zembutsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/283,879

(22) PCT Filed: Mar. 31, 2021

(86) PCT No.: PCT/JP2021/013894
§ 371 (c)(1),
(2) Date: Sep. 25, 2023

(87) PCT Pub. No.: WO2022/208754
PCT Pub. Date: Oct. 6, 2022

(65) Prior Publication Data
US 2024/0056347 A1 Feb. 15, 2024

(51) Int. Cl.
*G06F 15/173* (2006.01)
*H04L 41/0654* (2022.01)
(Continued)

(52) U.S. Cl.
CPC ........ *H04L 41/0654* (2013.01); *H04L 43/065* (2013.01); *H04L 43/0817* (2013.01)

(58) Field of Classification Search
CPC .............. H04L 41/0654; H04L 43/065; H04L 43/0817; H04L 41/0663; H04L 41/0816; H04L 41/40; G06F 9/45533
See application file for complete search history.

(56) References Cited

U.S. PATENT DOCUMENTS

| | | | |
|---|---|---|---|
| 2016/0277509 A1* | 9/2016 | Qiang | H04L 67/1001 |
| 2021/0111942 A1* | 4/2021 | Tahhan | H04L 43/20 |
| 2021/0194790 A1* | 6/2021 | Fukuoka | H04L 41/122 |

FOREIGN PATENT DOCUMENTS

| | | |
|---|---|---|
| CN | 105530116 A | 4/2016 |
| JP | 2018-112898 A | 7/2018 |

(Continued)

OTHER PUBLICATIONS

International Search Report for PCT Application No. PCT/JP2021/013894, mailed on May 25, 2021.

(Continued)

*Primary Examiner* — John B Walsh

(57) ABSTRACT

A management apparatus according to the present disclosure includes a VIM (Virtualized Infrastructure Manager) (3) configured to perform control of a NFVI (Network Function Virtualization Infrastructure), which provides virtual resources for a Virtual Network Function (VNF) (4) executed as a network function implemented in software, an NFVO (NFV-Orchestrator) (1) for realizing network services on the NFVI, a VNFM (VNF Manager) (2) configured to perform management of the VNF (4), a detecting unit (11) configured to detect data failure in the VNFM, and a constructing unit (12) configured to construct operation data for a new VNFM by collecting information from the NFVO (1), the VIM (3), and the VNF (4) in the case where the data failure is detected by the detecting unit.

12 Claims, 4 Drawing Sheets

(51) Int. Cl.
*H04L 43/065* (2022.01)
*H04L 43/0817* (2022.01)

(56) References Cited

FOREIGN PATENT DOCUMENTS

| JP | 2018-531549 A | 10/2018 |
| WO | 2016/052492 A1 | 4/2016 |
| WO | 2016/121869 A1 | 8/2016 |
| WO | 2019/240274 A1 | 12/2019 |

OTHER PUBLICATIONS

ETSI GS NFV 002 V1.1.1 (Oct. 2013), "Network Functions Virtualisation (NFV); Figure 4. NFV Reference Architectural Framework".
JP Office Action for JP Application No. 2023-510045, mailed on Aug. 6, 2024 with English Translation.

* cited by examiner

MANAGEMENT APPARATUS, MANAGEMENT METHOD, COMPUTER-READABLE MEDIUM STORING PROGRAM

This application is a National Stage Entry of PCT/JP2021/013894 filed on Mar. 31, 2021, the contents of all of which are incorporated herein by reference, in their entirety.

TECHNICAL FIELD

The present disclosure relates to a management apparatus, a management method, and a computer-readable medium storing a program for Network Functions Virtualization (NVF).

BACKGROUND ART

It is known that NFV and the like realize networks in software using virtualization technology. In Non-Patent Literature 1, NFV reference architectural framework is defined by the European Telecommunications Standards Institute (ETSI).

In this architecture, NFV MANO (Management and Orchestration) includes a NFVO (NFV Orchestrator), a VNFM (VNF Manager) and a VIM (Virtualized Infrastructure Manager). The VNFM performs operation and management of the Virtual Network Function (VNF), which implements network functions in a Virtual Machine (VM).

Patent Literature 1 discloses a virtualized management and orchestration device equipped with a database (DB) that holds data for the NFVO, a DB that holds data for the VNFM, a DB that holds data for the VIM, and a synchronization unit configured to synchronize data between at least two of the above DBs. In this device, when the NFVO detects that the state of the VNF is unknown (for example, the data contained in the Virtual Network Function Record (VNFR) held by the DB of NFVO is undefined), the maintenance personnel uses the data held in the DB for VNFM or VIM to update the corresponding data in the DB of the NFVO to restore data integrity.

CITATION LIST

Patent Literature

Patent Literature 1: International Patent Publication No. WO 2016/052492 Non Patent Literature
Non-Patent Literature 1: ETSI GS NFV 002 V1.1.1 (2013-10) Network Functions Virtualisation (NFV); FIG. 4. NFV Reference Architectural Framework

SUMMARY OF INVENTION

Technical Problem

If data inconsistency occurs in the VNFM, backup data may be used to restore the data. However, if the backup data is out of date due to the operational method used, there is a risk that difference from the latest VNF state may occur and thus the VNF can no longer be controlled.

There is also a way to reconstruct the VNF, but there is a problem in that the impact of having to stop and restart the VNF, which would cause service interruption, is significant. Since the management information of the VNF is newly created by reconstructing the VNF, it is assumed that the information on the VNF which has been used until then will be destroyed, which may cause operational problems.

An object of the present disclosure is to provide a management apparatus, a management method, and a computer-readable medium storing a program, each adapted to construct a new VNFM with the latest data possible without having to use any backup data.

Solution to Problem

According to an aspect of the present disclosure, a management apparatus includes: a VIM (Virtualized Infrastructure Manager) configured to perform control of a NFVI (Network Function Virtualization Infrastructure), which provides virtual resources for a VNF (Virtual Network Function) executed as a network function implemented in software; an NFVO (NFV-Orchestrator) for realizing network services on the NFVI; a VNFM (VNF Manager) configured to perform management of the VNF; a detecting unit configured to detect data failure in the VNFM; and a constructing unit configured to construct operation data for a new VNFM by collecting information from the NFVO, the VIM and the VNF in the case where the data failure is detected by the detecting unit.

According to another aspect of the present disclosure, a management method includes: detecting data failure in a VNFM (VNF Manager) configured to perform management of a VNF (Virtual Network Function) executed as a network function implemented in software; and in the case where the data failure is detected, constructing operation data for a new VNFM by collecting information from a VIM (Virtualized Infrastructure Manager) configured to perform control of a NFVI (Network Function Virtualization Infrastructure), which provides virtual resources for the VNF, from an NFVO (NFV-Orchestrator) for realizing network services on the NFVI, and from the VNF.

According to further another aspect of the present disclosure, a non-transitory computer-readable medium stores a program for causing a computer to execute processing of: detecting data failure in a VNFM (VNF Manager) configured to perform management of a VNF (Virtual Network Function) executed as a network function implemented in software; and constructing, in the case where the data failure is detected, operation data for a new VNFM by collecting information from a VIM (Virtualized Infrastructure Manager) configured to perform control of a NFVI (Network Function Virtualization Infrastructure), which provides virtual resources for the VNF, from an NFVO (NFV-Orchestrator) for realizing network services on the NFVI, and from the VNF.

Advantageous Effects of Invention

According to the aforementioned aspects, it is possible to provide a management apparatus, a management method, and a computer-readable medium storing a program, each adapted to construct a new VNFM with the latest data possible without having to use any backup data.

EXAMPLE EMBODIMENT

Example embodiments of the present disclosure will be described below with reference to the drawings. The following descriptions and drawings have been omitted and simplified where appropriate for clarity of explanation. In addition, in each of the following drawings, the same elements are denoted by the same reference symbols, and duplicate descriptions thereof have been omitted as necessary. In addition, the specific numerical values shown below are mere examples to facilitate understanding of the present disclosure and are not to be limited thereto.

Figure 1:
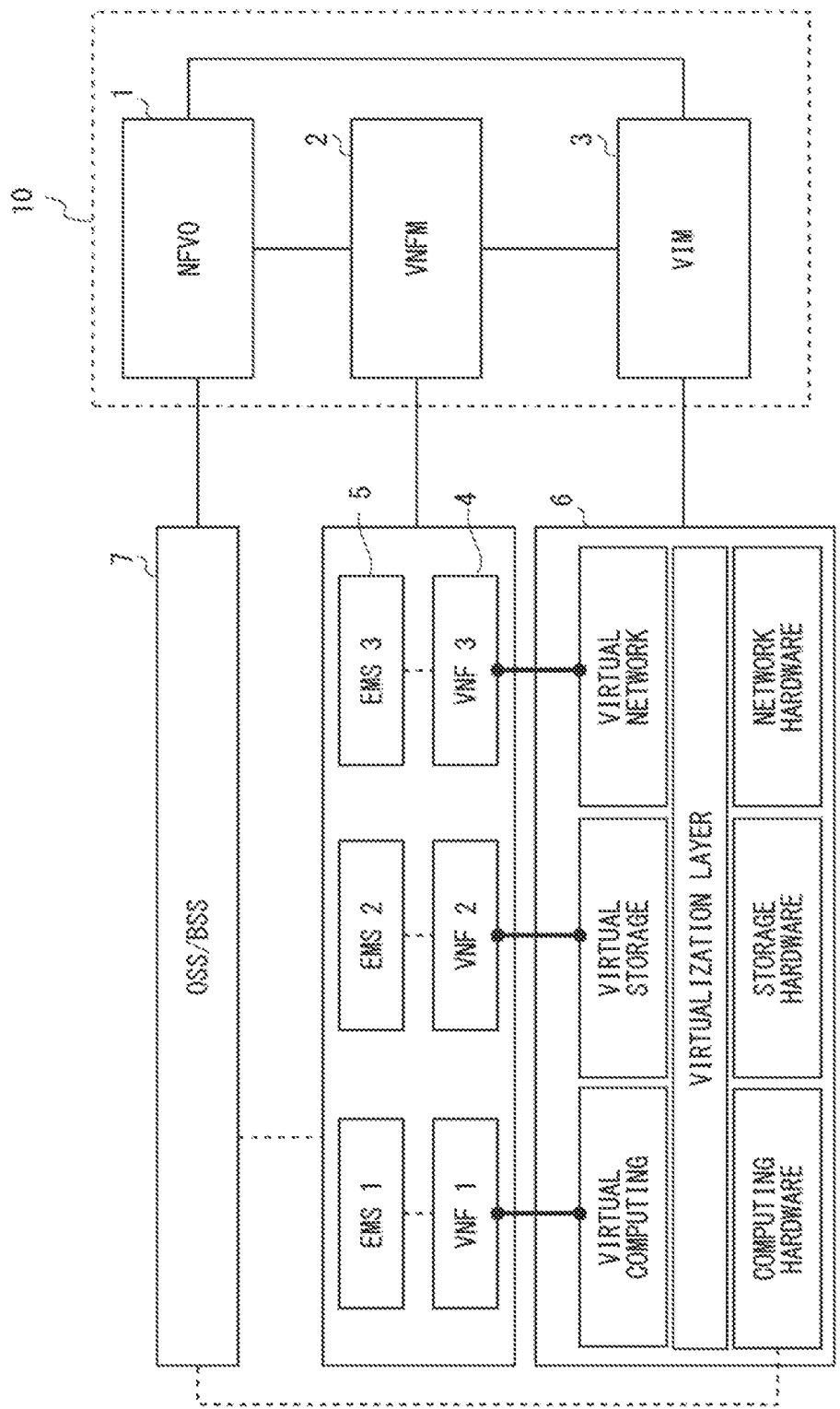
FIG. 1 is a diagram describing a NFV reference architecture as defined by ETSI.

An example embodiment relates to a management apparatus for Network Functions Virtualization (NFV) that realizes network functions in software by means of a Virtual Machine (VM) implemented on a virtualization layer on a server. First, a NFV reference architecture defined by ETSI will be described with reference to FIG. 1. FIG. 1 is a diagram describing a NFV reference architecture defined by ETSI.

Referring to FIG. 1, a VNF (Virtual Network Function) 4 is implemented in software and executed as a network function. In addition, an Element Management System (EMS) 5 is provided for each VNF4 as a management function. The VNF4 holds unique information such as performance setting information, fault information, etc.

A NFVI6 forms the execution base of the VNF4. The NFVI6 realizes the hardware resources of physical machines (servers) such as computing, storage, network functions, etc. as virtual resources such as virtualized computing, virtualized storage, virtualized networks virtualized by a virtualized layer such as a hypervisor, etc.

NFV MANO (Management and Orchestration) 10 provides management of hardware and software resources as well as the VNF management and orchestration functions. NFV MANO10 includes a NFVO (NFV-Orchestrator) 1, a VNFM (VNF manager) 2, and a VIM (Virtualized Infrastructure Manager) 3.

The NFVO1 performs management and orchestration of the VNF4 and the NFVI6. Specifically, the NFVO1 realizes network services (resource allocation to the VNF4 and management of VNF (e.g., auto-healing (automatic failure reconfiguration), auto-scaling, VNF lifecycle management, etc.) on the NFVI6. The NFVO1 holds and manages VNFR (VNF Record) information indicating the state of the VNF4 and the state of operation of the VNF4. The NFVO1 also manages VNFD (VNF Descriptor), which defines the configuration of the VNF4.

The VNFM2 preforms VNF4 life cycle management (e.g., generate, update, query, heal, scale, terminate, etc.) and event notification. The VNFM2 uses VNFD in performing VNF4 instantiation and VNF instance life cycle management.

The VIM3 implements the virtual resource allocation needed to run the VNF4. The VIM3 controls the NFVI6 through a virtualization layer to, for example, perform management of resources for computing, storage, and network, perform monitoring of failures of NFVI, which is the execution infrastructure of NFV, and perform monitoring of resource information.

Outside the NFV framework, there is an Operations Support Systems (OSS)/Business Support systems (BSS) 7.

OSS is a generic term for the systems (equipment, software, mechanics, etc.) that are, for example, necessary for telecommunications carriers to build and operate their services. BSS is a generic term for the information systems (equipment, software, mechanics, etc.) that, for example, telecommunications carriers use for billing usage fees, invoicing, providing customer service, etc.

Thus, the example embodiment conforms to the NFV reference architecture defined in ETSI. As described above, the VNFM2 is defined as a mechanism for performing operation and management of VNFs as one component of NFV MANO10.

The VNFM2 has major connections with three communication counterpart systems. That is, the VNFM2 is linked to the NFVO1, the VIM3, and the VNF4. The VNFM2 sends and receives information to and from these three communication counterpart systems and performs management and operation of VNFs.

The inventors of the present disclosure came up with the idea of the following configuration of reconstructing the VNFM2 using the latest information possible in the event that data inconsistency occurs in the VNFM2 and restoration of the system is not possible. The information to be managed by the VNFM2 is configured based on the information held by the aforementioned three communication counterpart systems. Using this characteristic, the information to be managed by the VNFM2 can be collected from the three communication counterpart systems whereby the VNFM can be reconstructed.

Figure 2:
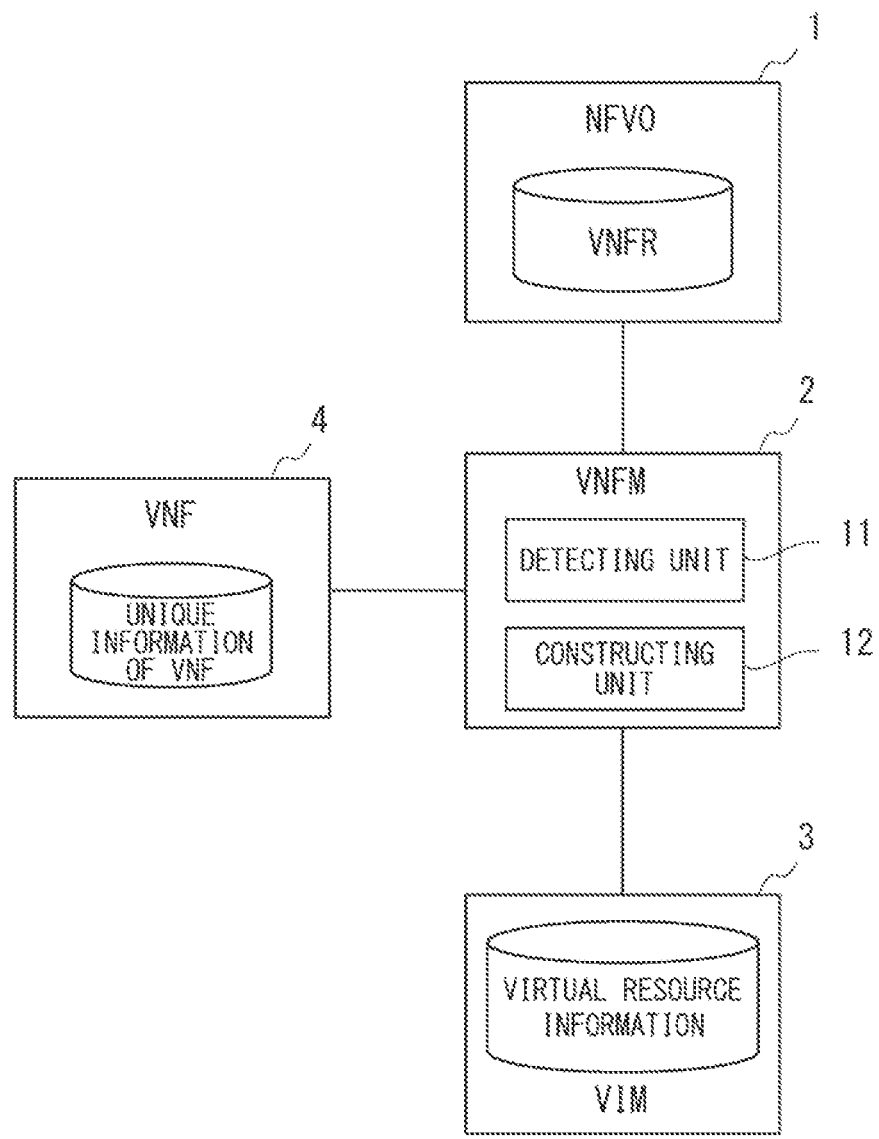
FIG. 2 is a block diagram showing a configuration of a management apparatus according to an example embodiment.

FIG. 2 is a block diagram showing a configuration of a management apparatus according to the example embodiment. In FIG. 2, the same structural elements/components as those in FIG. 1 are denoted by the same reference symbols. As shown in FIG. 2, the management apparatus includes the NFVO1, the VNFM2, the VIM3, and the VNF4. Further, the VNFM2 includes a detecting unit 11 and a constructing unit 12.

The detecting unit 11 detects data failure in the VNFM2. The constructing unit 12 constructs a new VNFM by collecting information from the NFVO1, the VIM3, and the VNF4 in the case where data failure is detected by the detecting unit 11. In this way, in the example embodiment, by acquiring information from the three communication counterpart systems, it is possible to construct a new VNFM and restore the system.

The VNFM2 holds the following information for performing management of the VNF4.

VNF Configuration Information

For the configuration information of the VNF4, information such as VNF name, VNF function, FPGA availability, VNF image file, and FPGA compatibility is held.

Connection Information to VIM for Acquiring Virtual Resources

Information to the VIM3 includes, for example, an identifier of the VIM3 and information about virtual resources allocated by the VIM3. Information about virtual resources allocated may include the type and the number of resources allocated.

Policy Information for VNF Lifecycle Management

This policy information is used to describe the equipment's authority to perform lifecycle management operation on the VNF4 and deploy network services to the VNF4.

If the operation data for VNFM2 is corrupted, in order to restore the above information, the VNFM2 must acquire information from the communication counterpart systems using the following information as keys.

Connection Information to the Communication Counterpart Systems (NFVO1, VIM3, VNF4)

Listed Information of the VNF4 in Operation

Figure 3:
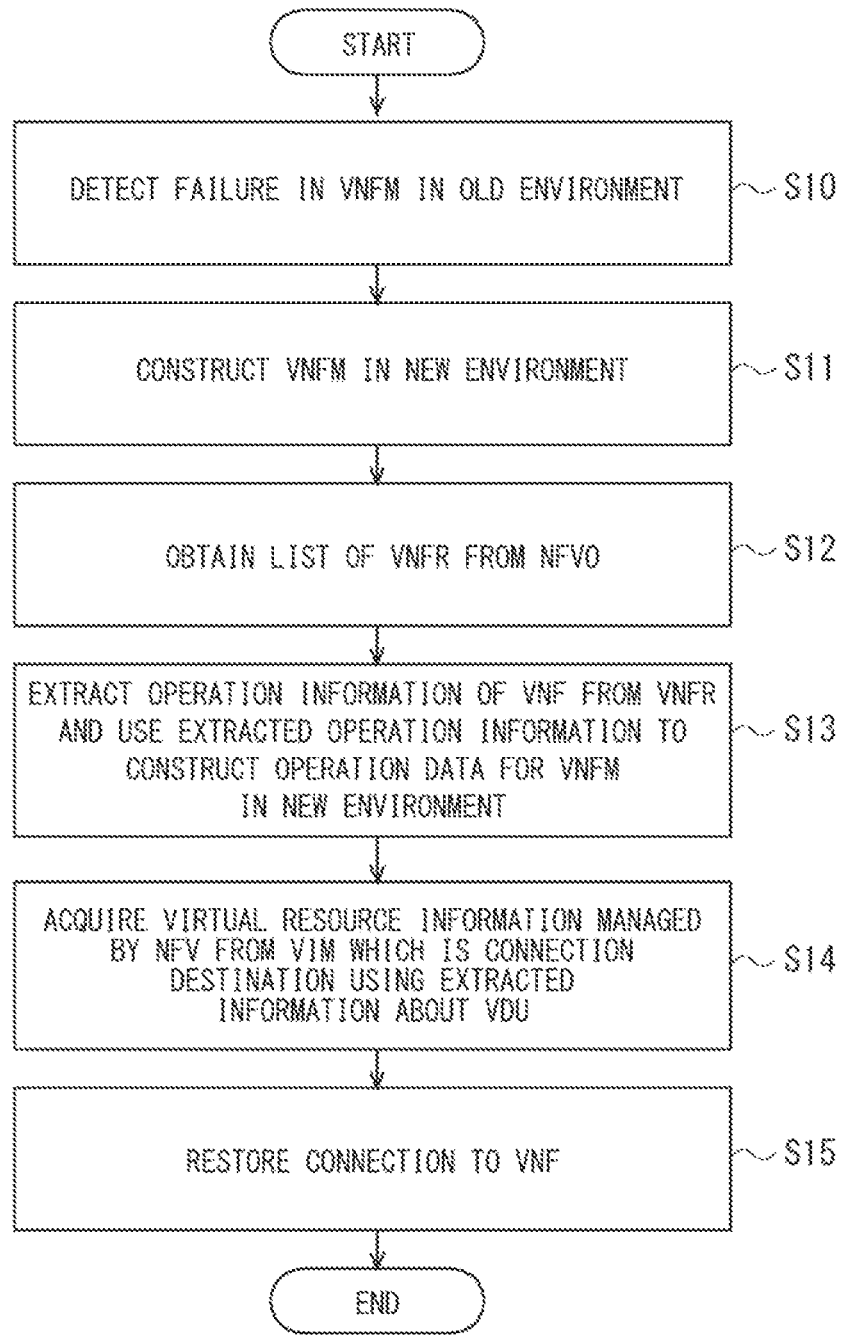
FIG. 3 is a flow chart showing a management method according to an example embodiment.
Figure 4:
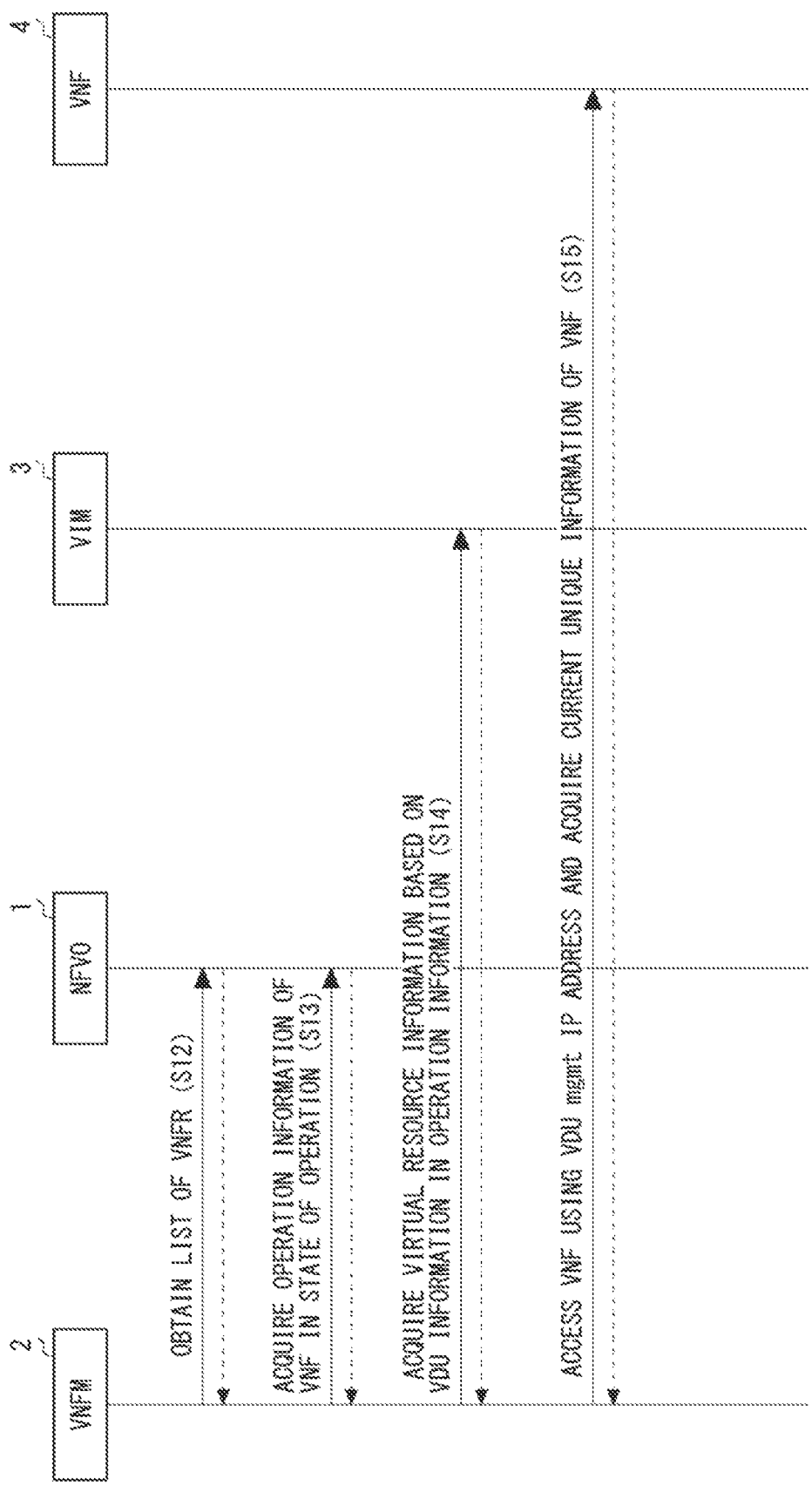
FIG. 4 is a diagram illustrating a sequence of the management method according to an example embodiment.

A method for acquiring information from the communication counterpart systems in the event a failure occurs in the VNFM2 is described with reference to FIGS. 3 and 4. FIG. 3 is a flow chart showing a management method according to the example embodiment, and FIG. 4 is a diagram illustrating a sequence of the management method. In the following explanation, the failed VNFM is the VNFM in the old environment, and the VNFM newly constructed for restoration is the VNFM in the new environment. The VNFM2 in FIG. 4 is the VNFM in the new environment. In FIG. 4, the parts corresponding to the steps of FIG. 3 are denoted by the same symbols.

In step S10, the detecting unit 11 detects a failure in the VNFM in the old environment. When a failure in the VNFM in the old environment is detected, the operator constructs a new VNFM for the VNFM to be restored (step S11). When constructing the VNFM2 in the new environment, the constructing unit 12 sets connection information (such as EndPoint) with the communication counterpart systems connected in the old environment. At this time, the VNFM2 in the new environment does not hold operation information related to the VNF4.

Next, the constructing unit 12 obtains a list of VNFRs from the NFVO1 (step S12). The VNFRs include information that uniquely identifies the VNF4 (for example, VNF ID), VNFD information that describes the configuration of the VNF4, the operational and the operating status of the VNF4, connection information for performing management of the VNF4, and other operation information related to the VNF4.

After obtaining a list of VNFRs from the NFVO1, the constructing unit 12 extracts operation information of the VNFs from the obtained list of VNFRs. The operation information is then used to construct the operation data for the VNFM in the new environment (step S13).

The NFVO1 holds information on all the VNF4s operating on the NFVI6 as the VNFRs. Therefore, the constructing unit 12 can recognize the VNFs that are in a state of operation by referring to all of these VNFRs. Here, "VNF in a state of operation" refers to a VNF that has not been deleted from the operational and the operating status of the VNFR.

For example, the constructing unit 12 identifies the VNF4 that is in a state of operation. Using the operation information of the VNF4 identified to be in a state of operation, the constructing unit 12 may construct operation data for performing management of only the VNF4 in a state of operation in the VNFM2 in the new environment.

Specifically, the constructing unit 12 acquires, from the VNFR of the VNF4 identified to be in a state of operation, the configuration information of the VNF that is identified to be in a state of operation (information about the VDU (Virtual Deployment Unit) and the CP (Connection Point) configuring the VNF) and the connection information for accessing these resources, and constructs operation data for the VNF4 identified to be in a state of operation.

The aforementioned information about the VDU includes a VDU identifier and connection destination information of the VIM3 indicating which VIM3 the virtual resources were created through. Using the acquired information about the VDU of the VNF4 in a state of operation, the constructing unit 12 acquires the virtual resource information managed by the NFVI6 from the VIM3 connected to the VNF4 (step S14).

The information about the VDU held by the VNF4 is defined in the VNFD of the VNF package held by the NFVO1. Using this definition information and the virtual resource information confirmed in step S14, the configuration information (operation data) for the virtual resource of the VNF4 in the VNFM2 in the new environment is constructed.

Then, the VNFM2 restores the connection to the VNF4 (step S15). The constructing unit 12 acquires, from each VNFR, management connection information of the connection status to each VNF and the VDU. The management connection information, which is information about the connection status to the VNFs and the VDU, includes information of a connection destination IP address (VDUmgmt IP address) for the VNFM2 to perform management of the respective virtual resources.

Using the IP address, the VNFM2 accesses the VNF4. The constructing unit 12 uses this management connection information to access each VNF4 and acquires the current unique information of the VNF4, such as the stateless configuration information and the failure information, which are required for performing operations. Thus, according to the example embodiment, the operation data for the VNFM2 in the new environment can be constructed using the information acquired from each communication counterpart system.

As described above, according to the example embodiment, by collecting the information to be managed by the VNFM2 from the communication counterpart systems of the VNFM2, the operation data for the VNFM2 can be always restored with the latest information. In addition, the operation data for a new VNFM2 can be constructed without having to reconstruct the VNF4, which makes it possible to reduce the service downtime to less than the VNF reconstruction time.

In terms of hardware, each function block that performs various processes described in the drawings can be configured of a processor, a memory, and other circuits. It is also possible to realize the above processes by having a processor execute a program. Therefore, these functional blocks can be realized in various ways by hardware alone, software alone, or a combination thereof, and are not limited to any one of them.

The programs described above can be stored and provided to a computer using any type of non-transitory computer-readable medium. Non-transitory computer readable media include any type of tangible storage media. Examples of non-transitory computer readable media include magnetic storage media (e.g., floppy disks, magnetic tapes, and hard disk drives), optical magnetic storage media (e.g., magneto-optical disks), CD-ROM (Read Only Memory), CD-R, CD-R/W, and semiconductor memories (e.g., mask ROM, PROM (Programmable ROM), EPROM (Erasable PROM), flash ROM, and RAM (Random Access Memory)). Further, the programs may be provided to a computer using any type of transitory computer readable media. Examples of transitory computer-readable media include electric signals, optical signals, and electromagnetic waves. Transitory computer readable media can provide the programs to a computer via a wired communication line such as electric wires and optical fibers, or a wireless communication line.

While the present disclosure has been described above with reference to the example embodiments, the present disclosure is not limited to the example embodiments described above. Various modifications can be made to the configuration and details of the present disclosure that are understandable to those of ordinary skill in the art within the scope of the invention.

In addition, some or all of the above-described example embodiment (s) can be described as in supplementary note below, but not limited to:

(Supplementary Note 1)

A management apparatus comprising:
   a VIM (Virtualized Infrastructure Manager) configured to perform control of a NFVI (Network Function Virtualization Infrastructure), which provides virtual resources for a VNF (Virtual Network Function) executed as a network function implemented in software;
   an NFVO (NFV-Orchestrator) for realizing network services on the NFVI;
   a VNFM (VNF Manager) configured to perform management of the VNF;
   a detecting unit configured to detect data failure in the VNFM; and
   a constructing unit configured to construct operation data for a new VNFM by collecting information from the NFVO, the VIM and the VNF in the case where the data failure is detected by the detecting unit.

(Supplementary Note 2)

The management apparatus described in Supplementary Note 1, wherein
   the NFVO is configured to hold at least a VNFR (Virtualized Network Function Record), and
   the constructing unit is configured to:
      acquire the VNFR from the NFVO;
      extract operation information of the VNF from the acquired VNFR; and
      construct the operation data for the new VNFM using the extracted operation information.

(Supplementary Note 3)

The management apparatus described in Supplementary Note 2, wherein the constructing unit is configured to identify the VNF that is in a state of operation and construct the operation data for the new VNFM for performing management of the VNF identified to be in the state of operation.

(Supplementary Note 4)

The management apparatus described in Supplementary Note 3, wherein
   the constructing unit is configured to:
      acquire, from the VNFR, information about a VDU (Virtualization Deployment Unit) that is a structural element of the VNF in the state of operation;
      acquire, using the acquired information about the VDU, virtual resource information managed by the NFVI from the VIM which is the destination of connection of the VNE that is in the state of operation; and
      construct operation data for the new VNFM using the information about the VDU and the virtual resource information.

(Supplementary Note 5)

The management apparatus described in any of Supplementary Notes 2 to 4, wherein
   the constructing unit is configured to:
      acquire management connection information, which is information about a connection status to the VNF, from the acquired VNFR; and
      construct operation data for the new VNFM by accessing the VNF using the management connection information and acquiring unique information of the VNF.

(Supplementary Note 6)

A management method comprising:
   detecting data failure in a VNFM (VNF Manager) configured to perform management of a VNF (Virtual Network Function) executed as a network function implemented in software; and
   in the case where the data failure is detected, constructing operation data for a new VNFM by collecting information from a VIM (Virtualized Infrastructure Manager) configured to perform control of a NFVI (Network Function Virtualization Infrastructure), which provides virtual resources for the VNF, from an NFVO (NFV-Orchestrator) for realizing network services on the NFVI, and from the VNF.

(Supplementary Note 7)

The management method described in Supplementary Note 6, wherein
   the NFVO holds at least a VNFR (Virtualized Network Function Record),
   the VNFR is acquired from the NFVO,
   operation information of the VNF is extracted from the acquired VNFR, and
   operation data for the new VNFM is constructed using the extracted operation information.

(Supplementary Note 8)

The management method described in Supplementary Note 7, wherein the VNF that is in a state of operation is identified and the operation data for the new VNFM for performing management of the VNF identified to be in the state of operation is constructed.

(Supplementary Note 9)

The management method described in Supplementary Note 8, wherein
   information about a VDU (Virtualization Deployment Unit) that is a structural element of the VNF in the state of operation is acquired from the VNFR,
   virtual resource information managed by the NFVI is acquired from the VIM which is the destination of connection of the VNF that is in the state of operation using the acquired information about the VDU, and
   operation data for the new VNFM is constructed using the information about the VDU and the virtual resource information.

(Supplementary Note 10)

The management method described in any of Supplementary Notes 7 to 9, wherein
   management connection information, which is information about a connection status to the VNF, is acquired from the acquired VNFR; and
   operation data for the new VNFM is constructed by accessing the VNF using the management connection information and acquiring unique information of the VNF.

(Supplementary Note 11)

A non-transitory computer-readable medium storing a program for causing a computer to execute processing of:
   detecting data failure in a VNFM (VNF Manager) configured to perform management of a VNF (Virtual Network Function) executed as a network function implemented in software; and
   constructing, in the case where the data failure is detected, operation data for a new VNFM by collecting information from a VIM (Virtualized Infrastructure Manager) configured to perform control of a NFVI (Network Function Virtualization Infrastructure), which provides virtual resources for the VNF, from an NFVO (NFV-Orchestrator) for realizing network services on the NFVI, and from the VNF.

(Supplementary Note 12)

The non-transitory computer-readable medium storing the program described in Supplementary Note 11, the program being for causing a computer to execute processing of:
having the NFVO hold at least a VNFR (Virtualized Network Function Record);
acquiring the VNFR from the NFVO;
extracting operation information of the VNF from the acquired VNFR; and
constructing operation data for the new VNFM using the extracted operation information.

(Supplementary Note 13)

The non-transitory computer-readable medium storing the program described in Supplementary Note 12, the program being for causing a computer to execute processing of identifying the VNF that is in a state of operation and constructing the operation data for the new VNFM for performing management of the VNF identified to be in the state of operation.

(Supplementary Note 14)

The non-transitory computer-readable medium storing the program described in Supplementary Note 13, the program being for causing a computer to execute processing of:
acquiring, from the VNFR, information about a VDU (Virtualization Deployment Unit) that is a structural element of the VNF in the state of operation;
acquiring, using the acquired information about the VDU, virtual resource information managed by the NFVI from the VIM which is the destination of connection of the VNF that is in the state of operation; and
constructing operation data for the new VNFM using the information about the VDU and the virtual resource information.

(Supplementary Note 15)

The non-transitory computer-readable medium storing the program described in any of Supplementary Notes 12 to 14, the program being for causing a computer to execute processing of:
acquiring management connection information, which is information about a connection status to the VNF, from the acquired VNFR; and
constructing operation data for the new VNFM by accessing the VNF using the management connection information and acquiring unique information of the VNF.

REFERENCE SIGNS LIST

1 NFVO
2 VNFM
3 VIM
4 VNF
5 EMS
6 NFVI
7 OSS/BSS
10 NFV MANO
11 Detecting Unit
12 Constructing Unit

What is claimed is:

1. A management apparatus comprising:
a VIM (Virtualized Infrastructure Manager) configured to perform control of a NFVI (Network Function Virtualization Infrastructure), which provides virtual resources for a VNF (Virtual Network Function) executed as a network function implemented in software;
an NFVO (NFV-Orchestrator) for realizing network services on the NFVI;
a VNFM (VNF Manager) configured to perform management of the VNF;
at least one processor; and
at least one memory storing instructions executable by the processor, wherein the processor is configured to:
detect data failure in the VNFM; and
construct operation data for a new VNFM by collecting information from the NFVO, the VIM and the VNF in the case where the data failure is detected,
wherein
the NFVO is configured to hold at least a VNFR (Virtualized Network Function Record), and
the processor is configured to:
acquire the VNFR from the NFVO;
extract operation information of the VNF from the acquired VNFR; and
construct the operation data for the new VNFM using the extracted operation information.

2. The management apparatus according to claim 1, wherein the processor is configured to identify the VNF that is in a state of operation and construct the operation data for the new VNFM for performing management of the VNF identified to be in the state of operation.

3. The management apparatus according to claim 2, wherein the processor is configured to:
acquire, from the VNFR, information about a VDU (Virtualization Deployment Unit) that is a structural element of the VNF in the state of operation;
acquire, using the acquired information about the VDU, virtual resource information managed by the NFVI from the VIM which is the destination of connection of the VNF that is in the state of operation; and
construct operation data for the new VNFM using the information about the VDU and the virtual resource information.

4. The management apparatus according to claim 1, wherein the processor is configured to:
acquire management connection information, which is information about a connection status to the VNF, from the acquired VNFR; and
construct operation data for the new VNFM by accessing the VNF using the management connection information and acquiring unique information of the VNF.

5. A management method comprising:
detecting data failure in a VNFM (VNF Manager) configured to perform management of a VNF (Virtual Network Function) executed as a network function implemented in software; and
constructing operation data for a new VNFM by collecting information from a VIM (Virtualized Infrastructure Manager) configured to perform control of a NFVI (Network Function Virtualization Infrastructure), which provides virtual resources for the VNF, from an NFVO (NFV-Orchestrator) for realizing network services on the NFVI, and from the VNF,
wherein
the NFVO holds at least a VNFR (Virtualized Network Function Record),
the VNFR is acquired from the NFVO,
operation information of the VNF is extracted from the acquired VNFR, and
operation data for the new VNFM is constructed using the extracted operation information.

6. The management method according to claim 5, wherein the VNF that is in a state of operation is identified and the operation data for the new VNFM for performing management of the VNF identified to be in the state of operation is constructed.

7. The management method according to claim 6, wherein information about a VDU (Virtualization Deployment Unit) that is a structural element of the VNF in the state of operation is acquired from the VNFR,
virtual resource information managed by the NFVI is acquired from the VIM which is the destination of connection of the VNF that is in the state of operation using the acquired information about the VDU, and
operation data for the new VNFM is constructed using the information about the VDU and the virtual resource information.

8. The management method according to claim 5, wherein management connection information, which is information about a connection status to the VNF, is acquired from the acquired VNFR; and
operation data for the new VNFM is constructed by accessing the VNF using the connection information and acquiring unique information of the VNF.

9. A non-transitory computer-readable medium storing a program for causing a computer to execute processing of:
detecting data failure in a VNFM (VNF Manager) configured to perform management of a VNF (Virtual Network Function) executed as a network function implemented in software;
constructing, in the case where the data failure is detected, operation data for a new VNFM by collecting information from a VIM (Virtualized Infrastructure Manager) configured to perform control of a NFVI (Network Function Virtualization Infrastructure), which provides virtual resources for the VNF, from an NFVO (NFV-Orchestrator) for realizing network services on the NFVI, and from the VNF;
having the NFVO hold at least a VNFR (Virtualized Network Function Record);
acquiring the VNFR from the NFVO;
extracting operation information of the VNF from the acquired VNFR; and
constructing operation data for the new VNFM using the extracted operation information.

10. The non-transitory computer-readable medium storing the program according to claim 9, the program being for causing a computer to execute processing of identifying the VNF that is in a state of operation and constructing the operation data for the new VNFM for managing the VNF identified to be in the state of operation.

11. The non-transitory computer-readable medium storing the program according to claim 10, the program being for causing a computer to execute processing of:
acquiring, from the VNFR, information about a VDU (Virtualization Deployment Unit) that is a structural element of the VNF in the state of operation;
acquiring, using the acquired information about the VDU, virtual resource information managed by the NFVI from the VIM which is the destination of connection of the VNF that is in the state of operation; and
constructing operation data for the new VNFM using the information about the VDU and the virtual resource information.

12. The non-transitory computer-readable medium storing the program according to claim 9, the program being for causing a computer to execute processing of:
acquiring connection information, which is information about a connection status to the VNF, from the acquired VNFR; and
constructing operation data for the new VNFM by accessing the VNF using the connection information and acquiring unique information of the VNF.

* * * * *